United States Patent
Saje et al.

(10) Patent No.: US 9,751,566 B2
(45) Date of Patent: Sep. 5, 2017

(54) ENERGY MANAGEMENT SYSTEM CONFIGURED TO STABILIZE A LATERAL DEFORMATION OF A SIDE PANEL OF A VEHICLE

(71) Applicant: GM GLOBAL TECHNOLOGY OPERATIONS LLC, Detroit, MI (US)

(72) Inventors: Robert N. Saje, Shelby Township, MI (US); Arthur Wyszynski, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 24 days.

(21) Appl. No.: 14/835,133

(22) Filed: Aug. 25, 2015

(65) Prior Publication Data

US 2017/0057551 A1     Mar. 2, 2017

(51) Int. Cl.
*B62D 21/15* (2006.01)
*B60N 2/68* (2006.01)
*B62D 25/20* (2006.01)

(52) U.S. Cl.
CPC ............. *B62D 21/157* (2013.01); *B60N 2/68* (2013.01); *B62D 25/2036* (2013.01)

(58) Field of Classification Search
CPC .. B60N 2/4235; B60N 2/42709; B62D 21/15; B62D 25/2009; B62D 25/2036
USPC .............. 296/187.08, 187.12, 193.02, 65.01, 296/193.08; 29/897.2, 428
See application file for complete search history.

(56) References Cited

U.S. PATENT DOCUMENTS

| | | | | |
|---|---|---|---|---|
| 5,584,525 A | * | 12/1996 | Nakano | B60N 2/4235 296/187.12 |
| 7,540,343 B2 | * | 6/2009 | Nakashima | B60K 1/00 180/65.1 |
| 8,100,462 B2 | * | 1/2012 | Minami | B60R 21/045 296/187.08 |
| 8,132,852 B2 | * | 3/2012 | Yamaki | B60N 2/4235 296/187.08 |
| 8,167,360 B2 | | 5/2012 | Deng et al. | |
| 8,979,173 B2 | * | 3/2015 | Kojo | B62D 21/15 296/187.08 |
| 2010/0244486 A1 | * | 9/2010 | Yamaki | B60N 2/4235 296/187.08 |

* cited by examiner

*Primary Examiner* — Glenn Dayoan
*Assistant Examiner* — Sunsurraye Westbrook
(74) *Attorney, Agent, or Firm* — Quinn IP Law

(57) ABSTRACT

A vehicle includes a seat frame rail, a pair of spaced reaction surfaces and an energy management system. The energy management system includes a lateral bar and a spacer. The lateral bar extends along a bar axis, between a pair of ends. The lateral bar is disposed between the reaction surfaces, such that each end of the lateral bar is in facing relationship with a respective reaction surface and the spacer is operatively disposed between the lateral bar and the seat frame rail. The lateral bar is operable to be displaced toward the seat frame rail when compressed between the reaction surfaces, along the bar axis. The spacer is operable to react against the lateral bar and the seat frame rail to transfer loads therebetween, such that the displacement of the lateral bar is resisted by the seat frame rail.

10 Claims, 3 Drawing Sheets

FIG.3

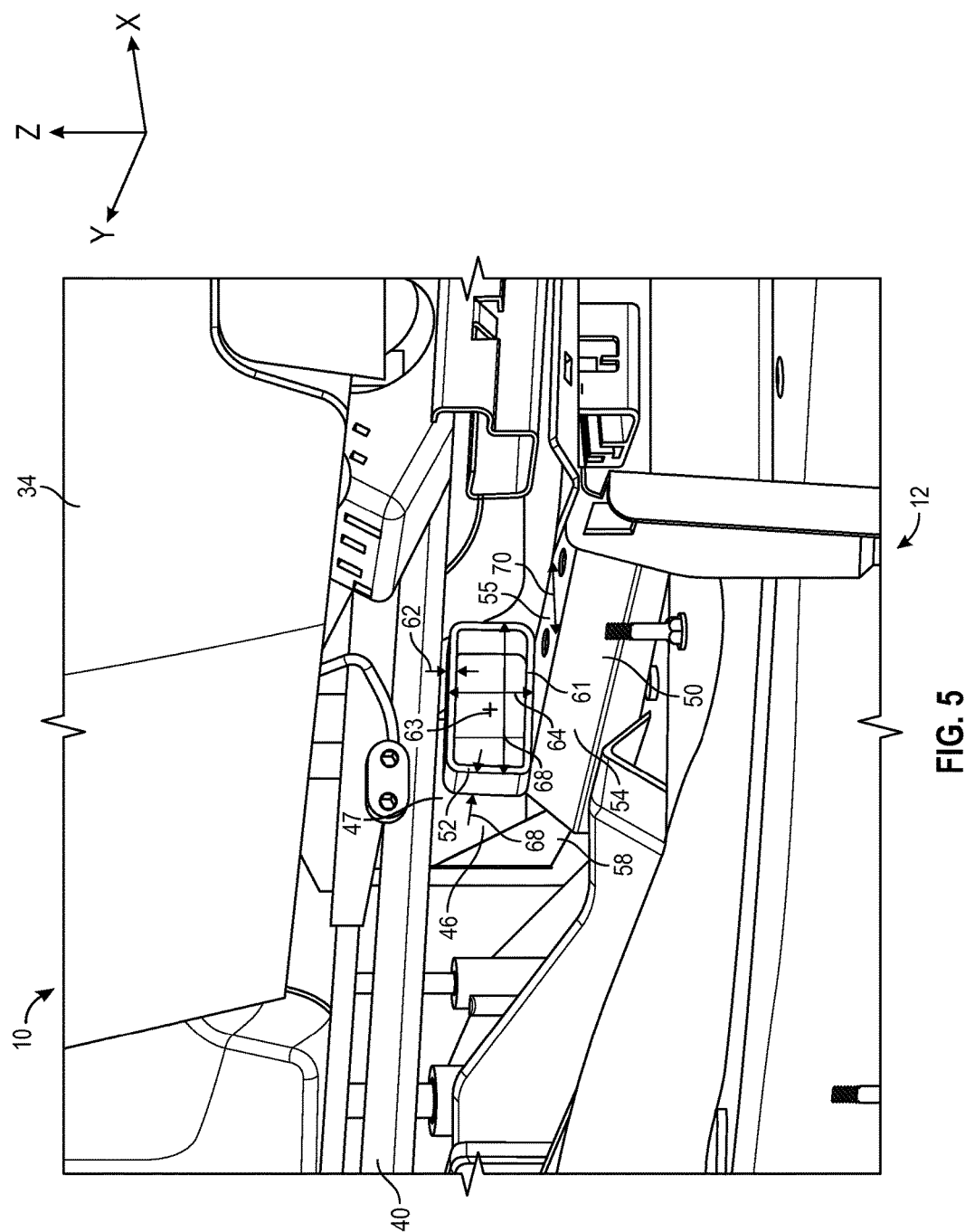

ENERGY MANAGEMENT SYSTEM CONFIGURED TO STABILIZE A LATERAL DEFORMATION OF A SIDE PANEL OF A VEHICLE

TECHNICAL FIELD

The present disclosure relates to an energy management system operable to react against a seat frame rail to stabilize deformation.

BACKGROUND

A vehicle may include a body structure extending between a front end and a rear end. The body structure defines a passenger compartment, and a plurality of cross members are disposed in the passenger compartment and extend laterally between opposing sides of the body structure. The cross members each extend along a length, between opposing ends. Each end is attached to the body structure, in laterally spaced relationship to one another. One of the sides of the body structure may be subject to an external force. In some embodiments, the external force may load one or more of the cross members in the lateral direction, for example compression load, along its length. When the cross member is loaded, the cross member deforms.

SUMMARY

One aspect of the disclosure provides an energy management system for a vehicle having a longitudinally extending seat frame rail and a pair of laterally spaced reaction surfaces, the energy management system includes a lateral bar and a spacer. The lateral bar extends lengthwise, along a bar axis, between a pair of ends. The lateral bar includes a support side. The spacer is operatively supported by the support side of the lateral bar. The energy management system is configured to be operatively disposed between the pair of reaction surfaces, such that each end of the lateral bar is disposed in facing relationship with a respective reaction surface and the spacer is operatively disposed between the lateral bar and the seat frame rail. The lateral bar is operable to be displaced toward the seat frame rail when compressed between the reaction surfaces, in response to an axial load being applied by one of the reaction surfaces, along the bar axis. The spacer is operable to react against the lateral bar and the seat frame rail to transfer loads therebetween, such that the displacement of the lateral bar is resisted by the seat frame rail.

Another aspect of the disclosure provides a body structure for a vehicle. The body structure includes rocker panel, a center support, a seat frame rail, a lateral bar, and a spacer. The rocker panel extends longitudinally. The center support is disposed in laterally spaced relationship to the rocker panel. The lateral bar extends lengthwise, along a bar axis, between a pair of ends. The lateral bar is operatively disposed between the center support and the rocker panel, such that one end of the lateral bar is disposed in facing relationship with the center support and the other end of the lateral bar is disposed in facing relationship with the rocker panel. The body structure also includes a seat frame rail extending in transverse and spaced relationship to the lateral bar. The lateral bar is operable to displace toward the seat frame rail when compressed between the center support and the rocker panel, in response to an axial load being applied to one of the center support and the rocker panel, along the bar axis. The body structure also includes a spacer, operatively disposed between the lateral bar and the seat frame rail. The spacer is operable to react against the lateral bar and the seat frame rail to transfer loads therebetween, such that the displacement of the lateral bar is resisted by the seat frame rail.

In yet another aspect of the disclosure, a vehicle includes a body structure extending longitudinally between a front end and a rear end. The body structure includes a center section disposed between the front end and the rear end. The body structure includes a first rocker panel, a second rocker panel, a center support, a pair of seat frame rails, a pair of lateral bars, and a pair of spacers. The first rocker panel and the second rocker panel each extend longitudinally, in spaced relationship to one another. The center support is laterally disposed between the first rocker panel and the second rocker panel. Each of the pair of lateral bars extends lengthwise, along a respective bar axis, between a pair of ends. Each of the pair of lateral bars is operatively disposed between the center support and a respective one of the first rocker panel and the second rocker panel, such that each end of each of the pair of lateral bars is disposed in facing relationship with the center support and the respective rocker panel. The seat frame rails each extend in transverse and spaced relationship to a respective one of the lateral bars. Each lateral bar is operable to displace toward the seat frame rail when compressed between the center support and the respective rocker panel, in response to an axial load being applied to one of the center support and the respective rocker panel, along the respective bar axis. The spacers are operatively disposed between a respective one of the lateral bars and a respective one of the seat frame rails. Each spacer is operable to react against the respective lateral bar and the respective seat frame rail to transfer loads therebetween, such that the displacement of the respective lateral bars is resisted by the respective seat frame rails.

The above features and advantages and other features and advantages of the present teachings are readily apparent from the following detailed description of the best modes for carrying out the present teachings when taken in connection with the accompanying drawings.

BRIEF DESCRIPTION OF THE DRAWINGS

FIG. 5 is a schematic perspective view of a portion of a side panel of the center section of the vehicle, with the energy management system disposed adjacent the side panel.

DETAILED DESCRIPTION

Figure 1:
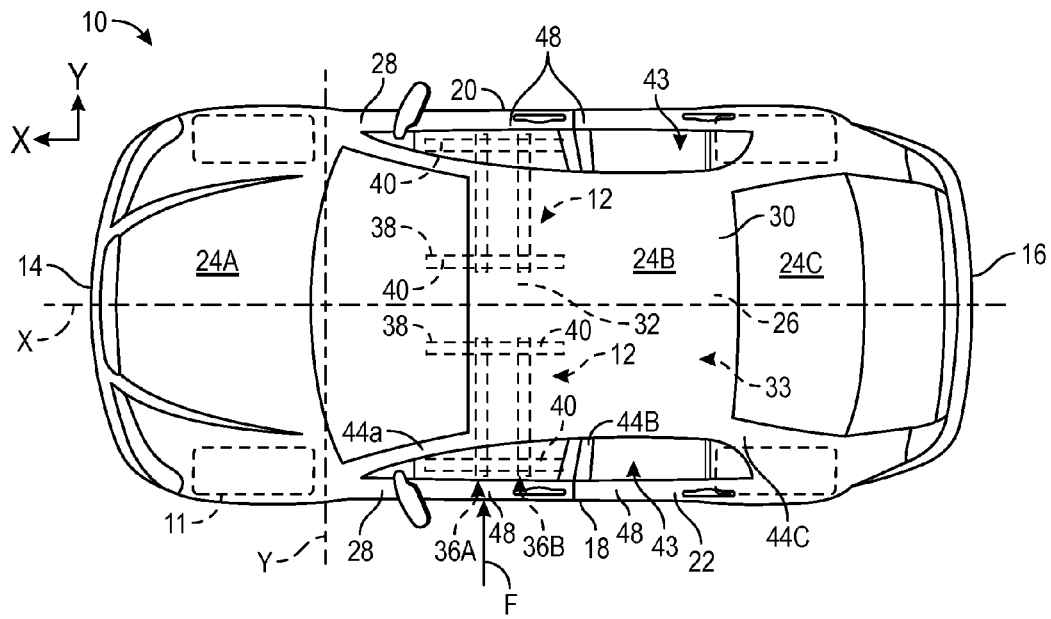
FIG. 1 is a schematic plan view of a vehicle with a body structure including a plurality of energy management systems.

Referring to the drawings, wherein like reference numbers refer to like components throughout the views, FIG. 1 shows a vehicle 10 that may be subject to an external force F. The vehicle 10 includes an energy management system 12 operable to stabilize a lateral deformation of a side panel 28 of the vehicle 10, when loaded as a result of the external force F, as explained in more detail below.

The vehicle 10 extends longitudinally, along a longitudinal axis X, i.e., in a longitudinal direction, between a front end 14 and a rear end 16, opposite the front end 14. The vehicle 10 also extends along a lateral axis Y, i.e., in a lateral direction, between a first side 18 (e.g., a left side) and a second side 20 (e.g., a right side).

The vehicle 10 includes a body structure 22 having body sections, i.e., a front section 24A, a center section 24B, and a rear section 24C. The front end 14 is disposed at the front section 24A of the body structure 22 and the rear end 16 is at rear section 24C of the body structure 22. The front section 24A defines an engine compartment (not shown) that may house a powertrain (not shown), as known to those of skill in the art, operable to transmit power to a road surface through one or more wheels 11. The rear section 24C may define a storage compartment (not shown), as known to those skilled in the art. It should be appreciated that the front and rear sections 24A and 24C are not limited to those described herein, as the front and rear sections 24A and 24C may have other configurations and uses, as known to those skilled in the art. The center section 24B defines a passenger compartment 33, configured for housing one or more occupants.

The center section 24B of the body structure 22 includes a floor panel 26, a pair of side panels 28, a roof panel 30, and the like, that combine to define the passenger compartment 33. The body structure 22 may be formed from any suitable materials, including steel, carbon fiber, aluminum, mixed materials, and other suitable materials. The floor panel 26 extends in the longitudinal direction, between the front section 24A and the rear section 24C, and extends in the lateral direction, between the first side 18 and the second side 20. A center support 32 may be centrally disposed in the lateral direction, i.e., between the first side 18 and second side 20. The center support 32 is elevated from the floor panel 26. The center support 32 may be a tunnel that is elevated from the floor panel 26 and operable to separate the passenger compartment 33 from a drive shaft (not shown), or other similar components, underneath the floor panel 26. It should be appreciated, however, that the floor panel 26 is not required to define the tunnel, as the center support 32 may be elevated from the floor panel 26.

Figure 2:
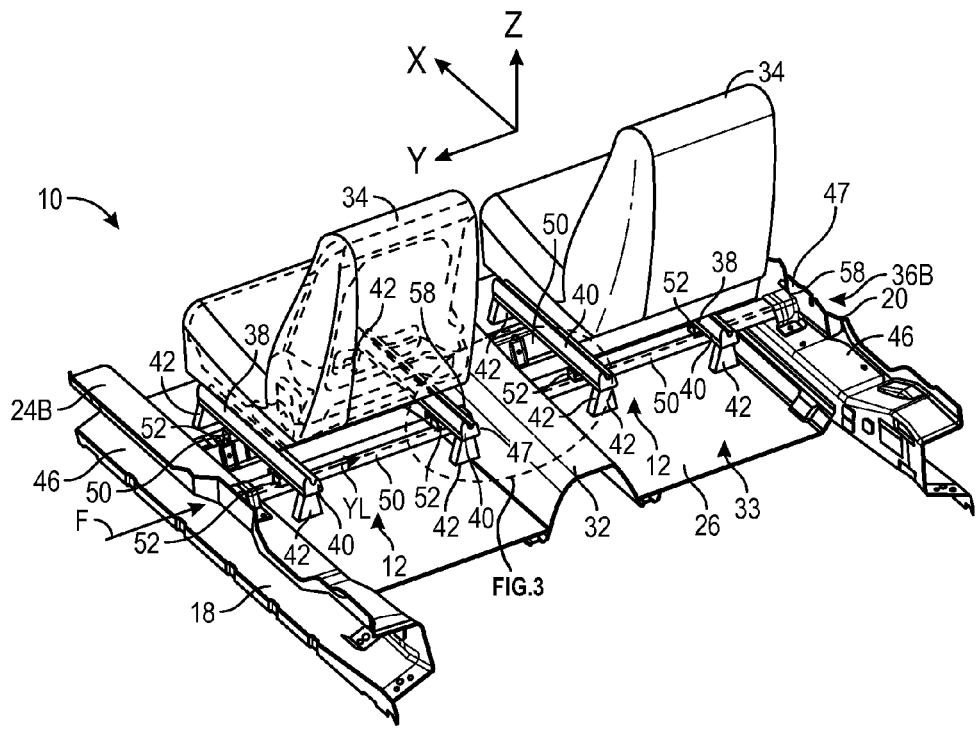
FIG. 2 is a schematic rear perspective view of a center section of the body structure including a floor panel, with a pair of seats, each supported by a pair of seat frame rails, and energy management systems disposed between the floor panel and the seat frame rails of the respective one of the seats.
Figure 3:
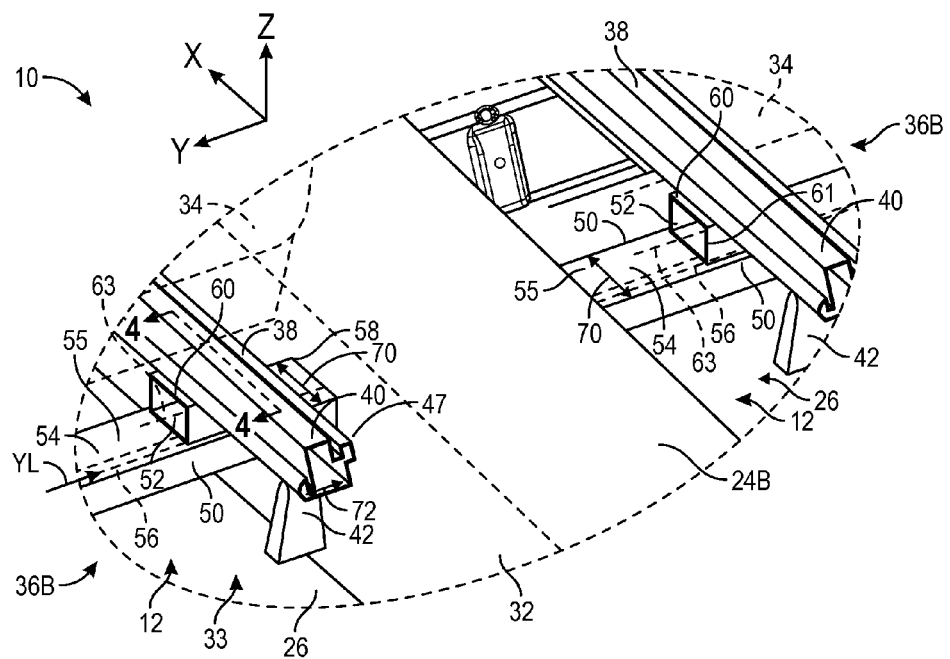
FIG. 3 is a schematic enlargement view of the area "FIG. 3" of FIG. 2, showing the energy management systems.

Referring now to FIGS. 1-3, the floor panel 26 operatively supports one or more seats 34, arranged in one or more rows within the passenger compartment 33 of the vehicle 10. Each seat 34 includes a frame 38 having a pair of seat frame rails 40 extending in spaced and generally parallel relationship to one another. The seat 34 is operatively attached to the floor panel 26. In one embodiment, referring to FIGS. 2 and 3, a plurality of risers 42, i.e., seat 34 supports, may be operatively disposed on, and secured to the floor panel 26 and the risers 42 operatively support the seat 34. When the seat 34 is in the passenger compartment 33, the pair of seat frame rails 40 longitudinally extend within the passenger compartment 33, in spaced relationship to the floor panel 26.

The side panels 28 each include a plurality of pillars 44A, 44B, 44C and door sills 46. The pillars 44A, 44B, 44C are vertical body members that extend between the roof panel 30 and the floor panel 26 to hold the roof panel 30 in spaced relationship to the floor panel 26. The pillars 44A, 44B, 44C include one or more of a pair of front pillars 44A (A-pillars); center pillars 44B (B-pillars); and rear pillars 44C (C-pillars), as are known to those of skill in the art. The pillars cooperate to define the door openings 43, on the first and second sides 18, 20 of the vehicle 10.

Door sills 46, may also be known as a first and a second rocker panel, are one or more rigid beams that are attached to the floor panel 26 and the corresponding pillars 44A, 44B, 44C at the respective first and second sides 18, 20 of the vehicle 10. The door sills 46 are disposed at each side of the vehicle 10. The door sills 46, pillars 44A, 44B, 44C, and roof panel 30 cooperate to define the door openings 43 and doors 48 are operatively disposed in the respective door openings 43, as understood by those skilled in the art.

Referring to FIGS. 1-3, each energy management system 12 may include a lateral bar 50 and a pair of spacers 52, operatively attached to a support side 55 of the lateral bar 50. A plurality of the energy management systems 12 may be arranged in each of two rows 36A, 36B. More specifically, a pair of energy management systems 12 are disposed in laterally spaced relationship to one another in a first row 36A and a pair of energy management systems 12 are similarly disposed in laterally spaced relationship to one another in a second row 36B. The second row 36B is longitudinally spaced from the first row 36A such that the second row 36B is longitudinally disposed between the first row 36A and the rear section 24C of the body structure 22.

With continued reference to FIGS. 1-3, the lateral bars 50, also known as cross members or compression members, are operatively disposed within the passenger compartment 33, proximate the floor panel 26, in spaced and transverse relationship to at least one seat frame rails 40. Each lateral bar 50 extends a length, along a bar axis 56, between a pair of ends 58. Each energy management system 12 is laterally disposed between the side panels 28 and the center support 32 of the floor panel 26, such that the ends 58 of each lateral bar 50 are disposed in laterally facing relationship to the respective side panels 28 and the center support 32. More specifically, the energy management system 12 may be laterally disposed between the respective door sills 46 and the center support 32 such that the ends 58 of each lateral bar 50 are disposed in laterally facing relationship to the respective door sills 46. As explained in more detail below, at least a portion of the door sills 46 and the center support 32 are operable to act as reaction surfaces 47 to the respective ends 58 of the lateral bar 50 in the event the respective side panel 28 is subject to the external force F. It should be appreciated that, while FIGS. 1-3 illustrate the external force F being applied to only the first side 18, it is conceivable that the external force F, as described herein, may be applied to the first side 18 and/or the second side 20 of the vehicle 10.

Figures 4A, 4B:
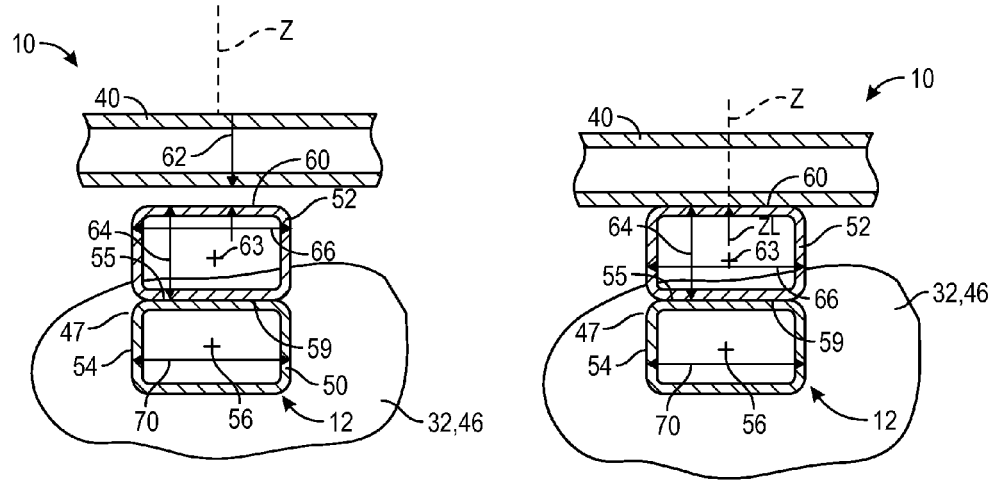
FIG. 4A is a cross-sectional side view, taken along line 4-4 of FIG. 3, with the energy management system including a lateral bar and a spacer, with the energy management system in a neutral position.
FIG. 4B is a cross-sectional side view, illustrating the energy management system in a displaced position.

Each lateral bar 50 may be operable to form a hollow beam cross section, as shown in the cross-sectional view of FIGS. 4A, 4B. The hollow beam cross section may include a single cell, or multiple cells. It should be appreciated that while FIGS. 4A, 4B are indicated as being a cross-sectional view, taken along line 4-4 of FIG. 3, which faces the door sill 46, FIGS. 4A, 4B also represent a cross-sectional view, facing the center support 32, i.e., opposite the door sill 46.

The lateral bar 50 presents an outer wall 54 that includes a plurality of sides, including a support side 55. The cross section may be shaped as a square, rectangle, pentagon, hexagon, and other suitable shapes. The cross section may have other shapes, so long as the cross section includes the support side 55 and the lateral bar 50 can operatively support a lateral load transfer of a lateral load YL along the lateral axis Y and operatively support a vertical load transfer of a vertical load ZL, along the vertical axis Z, resulting from the application of the external force F to one of the side panels 28, as explained in more detail below. The lateral bar 50 may be attached to the respective door sill 46, the center support 32, and/or the floor panel 26 via a weld, a mechanical fastener, an adhesive bond, a bracket, and/or any other suitable attachment.

With reference to FIGS. 2 and 3, in the event the force F is applied to one of the side panels 28, in the lateral direction Y, toward the center support 32, the door sill 46 may deform laterally toward the center support 32. As the door sill 46 is deformed laterally, the ends 58 of one or more corresponding lateral bars 50 may become compressed between the door sill 46 and the center support 32, thus causing a lateral load YL to be applied along the bar axis 56 of the lateral bar 50, as illustrated in FIG. 4B. As the lateral load YL is applied along the bar axis 56, the lateral bar 50 may become displaced away from the floor panel 26, from a neutral position (as illustrated in FIG. 4A) to a displaced position (as illustrated in FIG. 4B). More specifically, the energy management system 12 may be configured such that the lateral bar 50 becomes vertically displaced along the vertical axis Z, i.e., displaced upward, away from the floor panel 26.

Referring again to FIGS. 2-5, a pair of spacers 52 are operatively disposed between the lateral bar 50 and the respective seat frame rails 40 of the corresponding seat 34 and a gap 62 (as best shown in FIG. 4A) which may be defined between the spacer 52 and the seat frame rail 40. It should be appreciated, however, that a pair of spacers 52 are not required, as only one spacer 52 may be used. With reference to FIGS. 4A, 4B, each spacer 52 has a height 64 that is operable to define the desired gap 62 and the amount of vertical displacement is dependent on the size of the gap 62. As the lateral bar 50 becomes vertically displaced, as illustrated in FIG. 4B, the vertical displacement causes the respective spacer(s) 52 to move vertically, and into contact with the respective seat frame rail 40, such that the spacer 52 reacts between the lateral bar 50 and the corresponding seat frame rail 40 of the seat 34. The vertical displacement of the lateral bar 50 causes the lateral bar 50 and the spacer 52 to apply a vertical load ZL to the seat frame rail 40 of the seat 34, along a vertical axis Z, i.e., in a vertical direction. The spacers 52 are operable to limit the amount of vertical travel of the lateral bar 50 toward the seat frame rail 40, and thus the deformation of the seat frame rail 40, such that a lateral load YL along the bar axis 56 of the lateral bar 50, resulting from the application of the external force F, is transferred to the respective seat frame rail 40. Vertical travel of the lateral bar 50 refers to the displacement of the lateral bar 50 toward the seat frame rail(s) 40. Therefore, limiting the amount of vertical travel of the lateral bar 50, in response to the application of the external force F, allows the seat frame rail 40 to act as a back-up structure that assists the lateral bar 50 in maintaining its shape, i.e., limits the amount of buckling, which results in an improvement in energy absorption by the lateral bar 50. As such, the existing, high strength seat frame rail 40 is utilized to stabilize to inexpensively increase the load carrying capacity of the lateral bar 50. Thus, residual interior occupant space may be maintained upon the application of the external force F.

Referring specifically to FIGS. 4A and 4B, each spacer 52 may be operable to form the hollow beam cross section, having a single cell, or multiple cells. The spacer 52 may be formed from any desired material, such as steel, carbon, fiber, aluminum, mixed material, and other suitable materials. The spacers 52 may be attached to the lateral bar 50 via a weld, a mechanical fastener, an adhesive bond, and/or any other suitable attachment method. It should be appreciated that in an alternative embodiment, the spacers 52 may be operatively attached to the seat frame rail 40 of the seat 34 such that the gap 62 may be defined between the lateral bar 50 and the spacer 52. The size of the gap 62 may be configured such that a desired amount of vertical deformation of the lateral bar 50 is achieved before the seat frame rail 40 is engaged by the spacer 52, to maintain the load carrying capacity of the lateral bar 50.

The spacer 52 extends lengthwise along a secondary axis 63, between a pair of opposing faces 61. The secondary axis 63 of each spacer may be in spaced and parallel relationship to the bar axis 56 of the respective lateral bar 50. Each spacer 52 has a first side 59 and a second side 60, opposing the first side 59. Each side 59, 60 may extend in generally perpendicular relationship to each of the faces 61. The first side 59 faces the lateral bar 50 and the second side 60 faces the seat frame rail 40. The first side 59 is configured to be in contact relationship with the lateral bar 50, as shown in FIGS. 4A and 4B. Likewise, the second side 60 is configured to be in contact relationship with the seat frame rail 40 in response to the vertical displacement of the lateral bar 50, as described above and as shown in FIG. 4B.

Referring to FIGS. 4A, 4B, 5, the cross section may be square or rectangular in shape. Other shapes may be used, so long as the cross section provides for the first side 59 to sufficiently contact the support side 55 of the lateral bar 50 and the second side 60 to sufficiently contact the seat frame rail 40 and the cross section of the spacer 52 can operatively support a load transfer of the vertical load ZL along the Z axis, without collapsing, to limit the vertical displacement of the lateral bar 50, as desired. The spacer 52 includes a width 66, a length 68, and the height 64. The width 66 of the spacer 52 may be approximately equal to a corresponding width 70 of the lateral bar 50, i.e., in the longitudinal direction, so as to maximize contact between the first side 59 of the spacer 52 and the support side 55 of the lateral bar 50, during loading conditions. It should be appreciated that, in some embodiments, the width 66 of the spacer 52 may be smaller than the width 70 of the lateral bar 50 so as to accommodate weld locations when required to operatively attach the spacer 52 to the lateral bar 50 via some types of welding. The length 68 of the spacer 52 may be at least equal to a corresponding width 72 of the seat frame rail 40, i.e., in the longitudinal direction Y, so as to maximize contact between the second side 60 of the spacer 52 and the seat frame rail 40 during loading conditions. Further, the height 64 of the spacer 52 is operable to reduce a clearance in the vertical direction Z, i.e., the gap 62 defined between the lateral bar 50 and the seat frame rail 40, to control the amount of vertical displacement or deformation of the lateral bar 50.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A vehicle comprising:
    a body structure extending longitudinally between a front end and a rear end;
    wherein the body structure includes a center section disposed between the front end and the rear end, the center section including:
        a first rocker panel and a second rocker panel;
        wherein the first rocker panel and the second rocker panel each extend longitudinally, in spaced relationship to one another;

a center support, laterally disposed between the first rocker panel and the second rocker panel;

a pair of lateral bars, wherein each of the pair of lateral bars extends lengthwise, along a respective bar axis, between a pair of ends;

wherein each of the pair of lateral bars is operatively disposed between the center support and a respective one of the first rocker panel and the second rocker panel, such that each end of each of the pair of lateral bars is disposed in facing relationship with the center support and the respective one of the first rocker panel and the second rocker panel;

a pair of seat frame rails extending in transverse and spaced relationship to a respective one of the pair of lateral bars;

wherein each of the pair of lateral bars is operable to displace toward the respective one of the pair of seat frame rails when compressed between the center support and the respective one of the first rocker panel and the second rocker panel, in response to an axial load being applied to one of the center support and the respective one of the first rocker panel and the second rocker panel, along the respective bar axis; and a pair of spacers, wherein each of the pair of spacers is operatively disposed between a respective one of the pair of lateral bars and a respective one of the pair of seat frame rails;

wherein each of the pair of spacers is operable to react against the respective one of the pair of lateral bars and the respective one of the pair of seat frame rails to transfer loads therebetween, such that the displacement of the respective one of the lateral bars is resisted by the respective one of the seat frame rails.

2. The vehicle, as set forth in claim 1, wherein each of the pair of spacer has a height and a gap is defined between each of the pair of spacers and the respective one of the pair of seat frame rails.

3. The vehicle, as set forth in claim 1, wherein each of the pair of spacers is operatively attached to the respective one of the pair of lateral bars.

4. The vehicle, as set forth in claim 1, wherein each of the pair of spacers forms a hollow beam cross section.

5. The vehicle, as set forth in claim 1, wherein each of the pair of spacers is operatively attached to a respective one of the lateral bars.

6. The vehicle, as set forth in claim 5, wherein each of the pair of spacers has a height configured such that a gap is defined between the spacer and the respective seat frame rail when the respective lateral bar is operatively disposed between the center support and the respective one of the first and second rocker panels.

7. The vehicle, as set forth in claim 1, wherein each of the pair of spacers forms a hollow beam cross section.

8. The vehicle, as set forth in claim 7, wherein each of the pair of spacers extends lengthwise along a secondary axis, between a pair of faces.

9. The vehicle, as set forth in claim 8, wherein the secondary axis of each of the pair of spacers extends in spaced and parallel relationship to the respective bar axis.

10. The vehicle, as set forth in claim 1, wherein each of the lateral bars forms a hollow beam cross section.

* * * * *